Jan. 27, 1953     L. E. HARPER     2,626,787
PROPORTIONING DEVICE
Filed Feb. 21, 1947     5 Sheets-Sheet 1
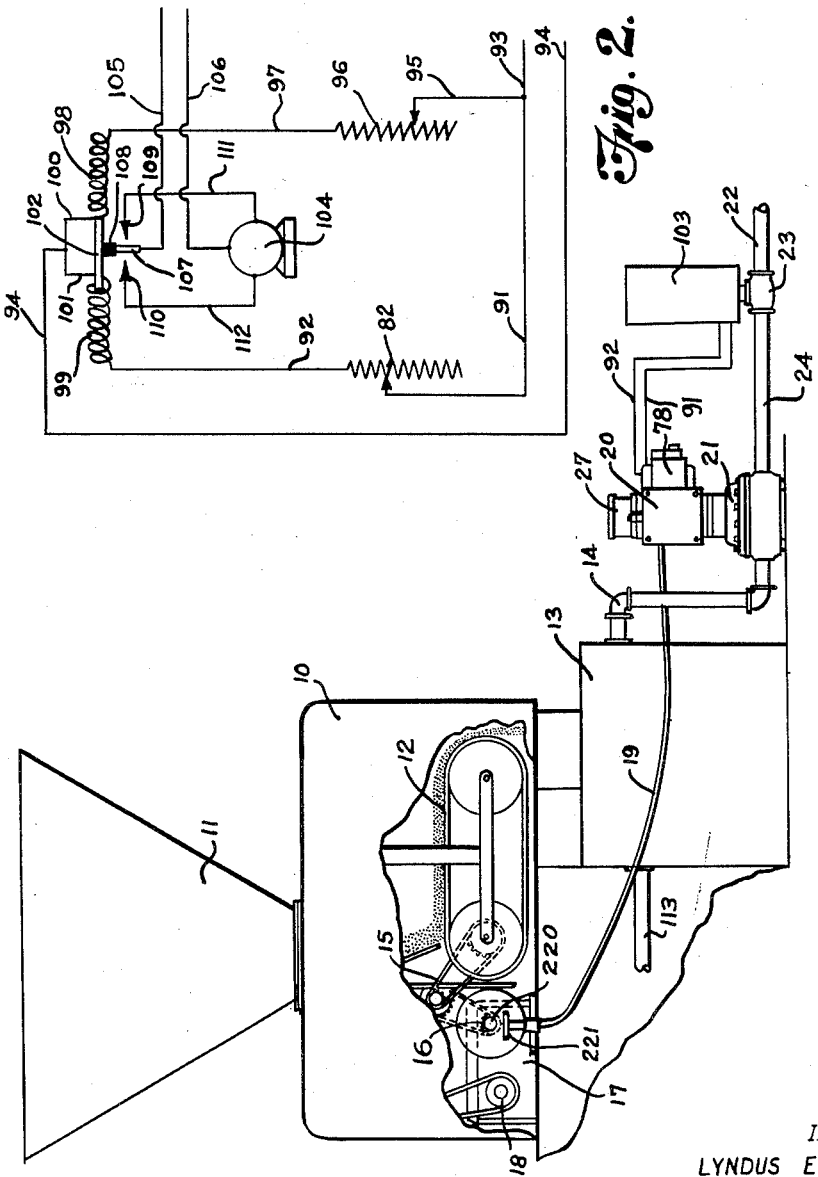
*INVENTOR.*
LYNDUS E. HARPER
BY
*Alfred R. Fuchs*
ATTORNEY Jan. 27, 1953         L. E. HARPER        2,626,787
PROPORTIONING DEVICE Filed Feb. 21, 1947                          5 Sheets-Sheet 2

INVENTOR.
LYNDUS E. HARPER
BY
Alfred R. Fuchs
ATTORNEY

Jan. 27, 1953 L. E. HARPER 2,626,787
PROPORTIONING DEVICE
Filed Feb. 21, 1947 5 Sheets-Sheet 3
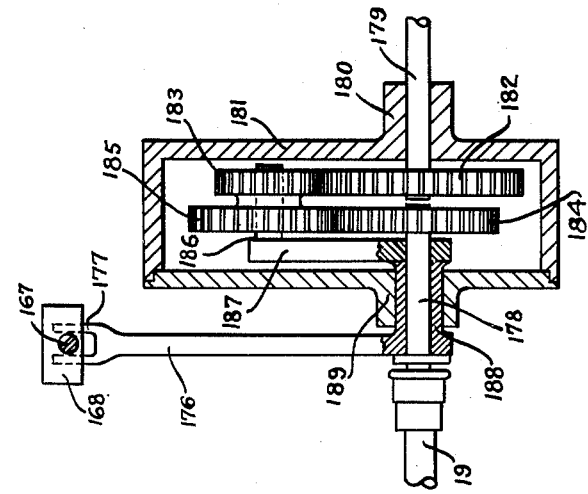
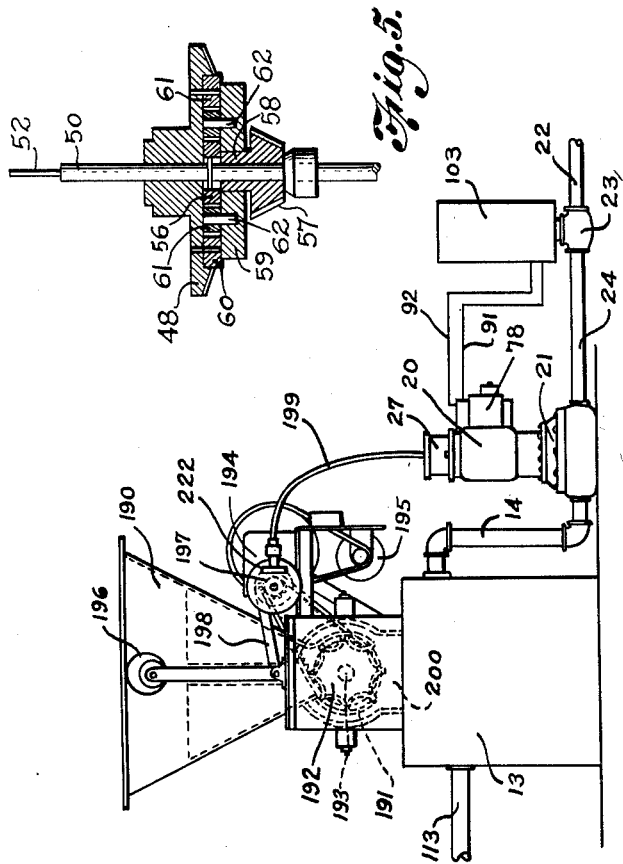
INVENTOR
LYNDUS E. HARPER
BY Alfred R Fuchs
ATTORNEY Jan. 27, 1953     L. E. HARPER     2,626,787
PROPORTIONING DEVICE Filed Feb. 21, 1947     5 Sheets-Sheet 4

INVENTOR
LYNDUS E. HARPER
BY Alfred R. Fuchs
ATTORNEY

Jan. 27, 1953        L. E. HARPER        2,626,787
PROPORTIONING DEVICE

Filed Feb. 21, 1947        5 Sheets-Sheet 5

INVENTOR
LYNDUS E. HARPER
BY Alfred R. Fuchs
ATTORNEY

Patented Jan. 27, 1953

2,626,787

UNITED STATES PATENT OFFICE 2,626,787

PROPORTIONING DEVICE

Lyndus E. Harper, Chicago, Ill., assignor to Omega Machine Company, Providence, R. I., a corporation of Missouri Application February 21, 1947, Serial No. 730,162

11 Claims. (Cl. 259—18)

My invention relates to proportioning devices, and more particularly to a device for continuously accurately proportioning two materials relative to each other, including means that positively controls the flow of one material at a desired rate and means for causing the flow of another material to automatically follow in correct proportion.

While numerous proportioning controlling devices have been previously known, these are only adapted to proportion two liquids or fluids to each other and are ordinarily actuated by two devices that are, in operation, similar to a water meter, being rotated by means of the water passing through a suitable conduit in which the meter is interposed and rotating at a rate proportional to the flow of said water. Such proportioning devices are not, due to the character thereof, adapted for proportioning a solid material and a liquid to each other. My improved proportioning means is adapted to proportion a liquid to a solid material and may also be used for proportioning a liquid to another liquid.

My invention is particularly adapted to control the operation of a valve either by electrically operated controlling means or controlling means operated by variations in air pressure. In my improved proportioning device the position of said valve is determined by actuating the electrical or air pressure control therefor by a differential mechanism which is operated by the combined action of a member actuated by a feeder and a member actuated by a liquid metering device. The feeder is, preferably, a feeder for dry material, although my invention is adaptable for use in connection with certain feeders for liquid material also.

While my invention is particularly adapted for controlling the flow of a liquid through the positioning of a valve in proportion to the flow of feed of a solid material that is fed by suitable feeding means, it is also adapted for controlling the position of a valve in proportion to the feed of a liquid, which liquid feeding means is capable of feeding at various rates. The feeding means for the solid material is also adapted for feeding at various rates and the rate of feed may be either automatic or manually adjustable, in the case of either the liquid or dry material feeding means, the rate of feed of which controls the position of the valve that controls the supply of liquid.

Other objects and advantages of my invention will appear as the description of the drawings proceeds. I desire to have it understood, however, that I do not intend to limit myself to the particular details shown or described, except as defined in the claims.

In the drawings:

Fig. 1 is a side elevational view partly broken away of my improved controlling means for controlling the flow of a liquid in proportion to the feed of a solid or dry material.

Fig. 2 is a diagrammatic view of the electrical connections provided in my controlling device.

Fig. 5 is a detail sectional view through the differential drive mechanism employed in the form of the invention shown in Figs. 3 and 4.

Fig. 8 is a fragmentary sectional view of a further modification.

Fig. 9 is a view similar to Fig. 1, but showing a different feeder for the solid or dry material.

Figure 3:
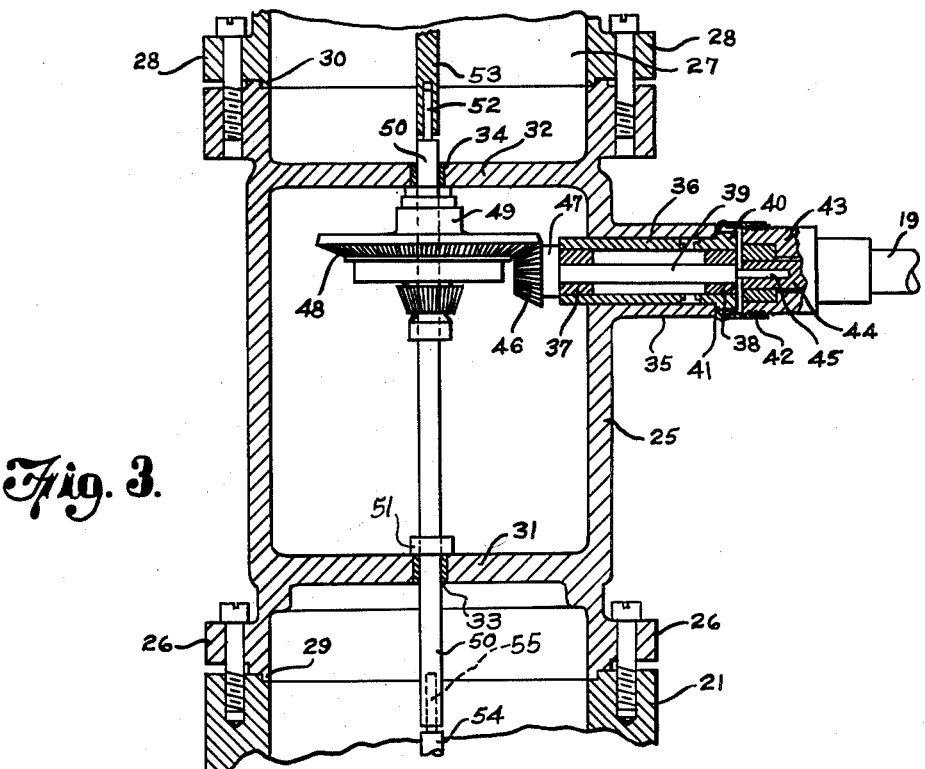
Fig. 3 is a vertical sectional view on an enlarged scale of the differential mechanism employed in the form of the invention shown in Fig. 1.

Referring in detail to the drawings, in Fig. 1 is shown a dry material feeder 10, which is provided with any suitable supply means, such as a hopper 11, and which is shown as being of a belt type gravimetric feeder having the belt 12 for feeding the solid material into a mixing chamber 13, in which the same is mixed in a suitable manner with a liquid supplied through the pipe 14 so as to produce a suitable solution of the solid material in the liquid. The rate of feed of the feeder 10 is determined by the rate of travel of the feed belt 12, which is driven by a suitable sprocket drive 15 from the output sprocket 16 of a variable speed mechanism 17, which may be either manually adjusted or automatically adjusted, as by suitable weight controlled means through an adjusting device 18, which is not a part of this invention.

The output shaft 220 of the variable speed mechanism 17 drives a flexible shaft 19 through any suitable manually adjustable driving connection 221, shown as being a friction disk driving means. The flexible shaft 19 is thus driven at a predetermined speed relative to that of the output shaft 220, which remains fixed for any adjustment of the driving means 221. The flexible shaft 19 extends to the controlling device 20 mounted on a water meter 21 through which the water passes to the pipe 14, said water passing from a supply line 22 through a valve 23 to the pipe 24 which leads to the meter 21. The adjustment of the adjustable driving connection 22I determines the ratio to be maintained between the liquid fed into the mixing chamber 13 through the pipe 14 and the dry material fed to said mixing chamber from the feeder having the belt 12 or similar dry material feeding device.

Figure 4:
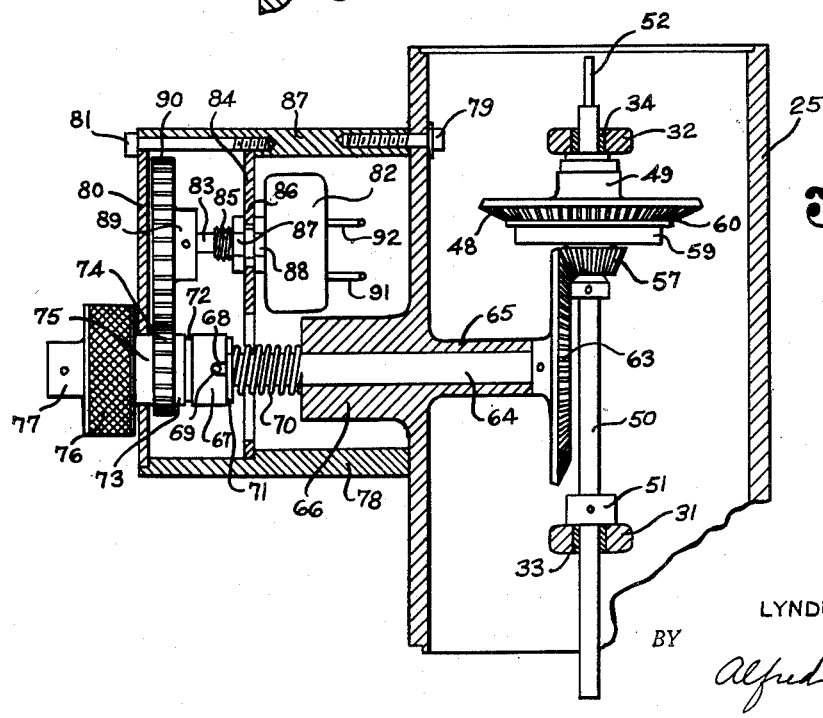
Fig. 4 is a vertical sectional view taken at right angles to Fig. 3, partly broken away.

The controlling device 20 is shown more in detail in Figs. 3 and 4, the same comprising a main housing 25, which is mounted on the water meter 21 in a suitable manner, ears 26 being shown as being provided for bolting the housing 25 to the water meter body 21. The water meter ordinarily is provided with a removable upper housing portion 27, in which the counting mechanism is located, and it will be noted upon reference to Fig. 3 that the housing 27 is provided with ears 28 for securing the same to the housing 25 in the same manner as it would have been secured to the water meter had the housing 25 not been interposed, the housing 25 having a downwardly extending flange portion 29, which seats in a suitable groove in the meter body 21 and the counting mechanism housing portion 27 having a similar depending flange 30 that seats in a groove in the upper end of the body portion 25. Said body portion also has a pair of transversely extending webs 31 and 32, which are provided with bearings 33 and 34 for a purpose to be described below.

The housing also has an outwardly extending tubular projection 35, in which a sleeve 36 is mounted, which is provided with the bearings 37 and 38 for a shaft 39. The sleeve has an annular enlargement 40 thereon between which and the end portion of the tubular projection 35 is mounted the hook flange 41 on the internally threaded sleeve 42, with which the threaded coupling member 43 engages to connect the shaft portion 44 on the flexible shaft member 19 with the reduced end portion 45 of the shaft 39, so that the shafts 19 and 39 will turn in unison.

A bevel gear 46 is fixed on the shaft 39 and spaced from the inner end of the tubular member 36 by a collar 47. Said bevel gear meshes with a large bevel ring gear 48, which has a hub portion 49 which is free to rotate on the shaft 50, which is mounted in the bearing 34. The shaft 50 is also mounted in the bearing 33, a collar 51 being pinned to the shaft 50 to hold the same in proper position so that the reduced end portion 52 thereof will engage with the shaft 53 of the counting mechanism. Said shaft 50 is driven by the meter shaft 54 through a coupling at 55.

A gear 56 is fixed on the shaft 50 and a bevel gear 57 is free to rotate on the shaft 50, said bevel gear 57 having a reduced extension 58 on its hub, on which the disk 59 is fixed. A ring gear 60 is fixed to the bevel gear 48 and pinions 61 that are rotatably mounted on the disk 59 on the shafts 62 mesh with the internal teeth on the ring gear 60 and with the external teeth on the gear 56. The bevel gear 57 meshes with a large bevel gear 63, which is fixed on the shaft 64, said shaft 64 being mounted in a tubular bearing portion 65 projecting inwardly, and an enlarged tubular portion 66 projecting outwardly from the housing 25.

The disk 59 will remain stationary when the shaft 50 and the shaft 39 are rotating at the desired speed ratio, this being determined by the sizes of the various gears provided in the differential gearing and the bevel gearing above described. If the speed of the shaft 39 increases relative to the speed of the shaft 50 above that desired, then the disk-like member 59 will be rotated in one direction due to the rotation of the pinion 61 around the shaft 50, while if the speed of the shaft 50 is too great relative to that of the shaft 39, then the disk-like member 59 will be rotated in the opposite direction. This will cause rotation of the shaft 64 in either one or the other direction, dependent upon the relative speed of the shafts 39 and 50.

The shaft 64 has a clutch member 67 rotatably mounted thereon, which has a pair of notches 68 therein, in which the pin 69 extending through the shaft 64 is adapted to engage normally, being held in engagement therewith by the compression spring 70 bearing against the disk 71, which engages with said clutch member, and which holds said clutch member in frictional engagement with a friction washer 72 interposed between the clutch member 67 and the forwardly projecting hub 73 on the gear 74, which is mounted in fixed position on the inwardly projecting hub portion 75 on a knurled knob 76, the shaft 64 having a collar 77 fixed thereto for holding the parts in position. The knob 76 is free to rotate on the shaft 64 to rotate the gear 74 independently of the shaft 64, should manual adjustment be desired, but normally the shaft 64 drives the gear 74 through the clutch mechanism at the same rate and in the same direction as the shaft 64.

The bearing projection 66 and clutch mechanism and gear 74 are located in a supplemental housing 78, which is secured to the housing 25 by means of suitable securing elements 79 and is provided with a cover plate 80 secured by means of the securing elements 81. Said supplemental housing 78 also has mounted therein a rheostat 82, which is adjusted by rotation of the rotor thereof, rotation in one direction increasing the resistance thereof, and rotation in the opposite direction decreasing the resistance thereof in a well known manner. Such rotation of the rotor of the rheostat is obtained by means of the shaft 83, which extends through an enlarged opening 86 in the partition 84. The rheostat 82 is mounted on said partition 84 by means of a tubular extension 85, which is externally threaded and has the nuts 87 and 88 engaging the threads thereon to clamp the rheostat to the partition 84. The shaft 83 extends through the tubular member 85 into the rheostat and is fixed to the rotor of said rheostat in any desired manner. The hub portion 89 of a gear 90 is fixed on the shaft 83 and the gear 90 meshes with the gear 74 so that rotation on the shaft 64 in one direction will adjust the rheostat to increase the resistance thereof and rotation of the shaft 64 in the other direction will adjust the rheostat to decrease the resistance thereof. The same thing can be accomplished manually by means of the knob 76 independently of the shaft 64, should this be found desirable.

The rheostat is interposed in a circuit, which is shown diagrammatically in Fig. 2, the rheostat being indicated as a variable resistance 82 in said circuit diagram. The conductors 91 and 92 lead from said rheostat, as will be obvious from Fig. 4. The conductor 91 is connected with a conductor 93 that extends from any suitable source of electrical energy, from which the conductor 94 also extends. A conductor 95 is also connected with the conductor 93, the conductors 91 and 95 constituting branches of the circuit of which the conductor 93 is a part. A variable resistance 96 is connected with the conductor 95 and the conductor 97, the conductor 97 having a winding 98 connected therewith and the conductor 92 having a winding 99 connected therewith, said windings 98 and 99 being connected by means of conductors 100 and 101 with the conductor 94. Thus the variable resistances 82 and 96 are connected in parallel with each other and the windings 98 and 99 are solenoids into which the core or plunger 102 is adapted to be drawn, dependent on whether the value of the current passing through the winding 98 or 99 is the greater. The variable resistance 96 is a part of the valve mechanism contained in the housing 103 and varies in accordance with the position of the valve member that controls flow through the valve 23, the position of which is determined by means of a motor indicated diagrammatically in Fig. 2 at 104.

The motor 104 is adapted to be reversed in direction, being connected with the line wires 105 and 106, the connection being made with the line wire 105 through a switching element 107, the position of which is determined by the position of the plunger 102, from which it is insulated by means of the insulating member 108. The switching member 107 cooperates with either the stationary contact 109 or 110, dependent upon whether the solenoid 98 attracts the armature or plunger 102 or the solenoid 109 attracts it. The conductor 111 leads from the fixed contact 109 to a terminal on the motor 104 that causes the same to rotate in one direction, and the conductor 112 extends from the stationary contact 110 to a terminal of the motor 104 that causes it to rotate in the opposite direction. Accordingly, if the resistance 82, the value of which is determined by the position of the rheostat, is less than the resistance 96 determined by the position of the valve, the current flowing through the winding 99 will be greater than that flowing through the winding 98, which will cause the motor 104 to rotate in a direction to open the valve 103 further. This causes such movement of the movable contact member of the variable resistance 96 as to decrease the value of said resistance, causing eventually a balanced condition between the current flowing through the winding 98 and through the winding 99, which will cause the contact member 107 to assume a position out of engagement with either of the contacts 109 and 110.

If the position of the valve resulting eventually causes the differential mechanism to adjust the variable resistance 82 to increase the value thereof, then the armature or core 102 will be attracted by the winding 98 to close the circuit to the conductor 111, reversing the direction of rotation of the motor 104 from that that previously took place, which will cause the valve to move to a more closed position and the variable resistance 96 to be increased thereby until a balanced condition again exists, whereupon the contact 107 will again assume an open circuit position and the motor will stop, the valve then remaining in that position until the differential mechanism again causes a change in the position of the rheostat, causing the motor 104 to either open or close the valve, whichever may be required.

The differential mechanism varies the resistance so as to open the valve further whenever the flow of liquid is too small in proportion to the feed of the dry material, and to close the valve when the flow of the liquid is too great in proportion to the feed of the dry material. Thus the differential mechanism in combination with the electrical means disclosed serves to maintain the desired proportionate feed of dry material and liquid to the container 13 in which a solution or suspension of the dry material in the liquid takes place and from which the resulting product discharges through the discharge pipe 113. The variations in the supply of the dry material to the container 13, which may be either controlled by automatic means or by manual means, thus determine the rate of flow of liquid through the pipe 24 to the meter 21 into the container 13. The meter through which said liquid flows serves as one of the means for maintaining the rate of flow through the valve 23 at the proper value to maintain the desired proportion between the dry material and the liquid that is fed to the tank or container 13.

Figures 6, 7:
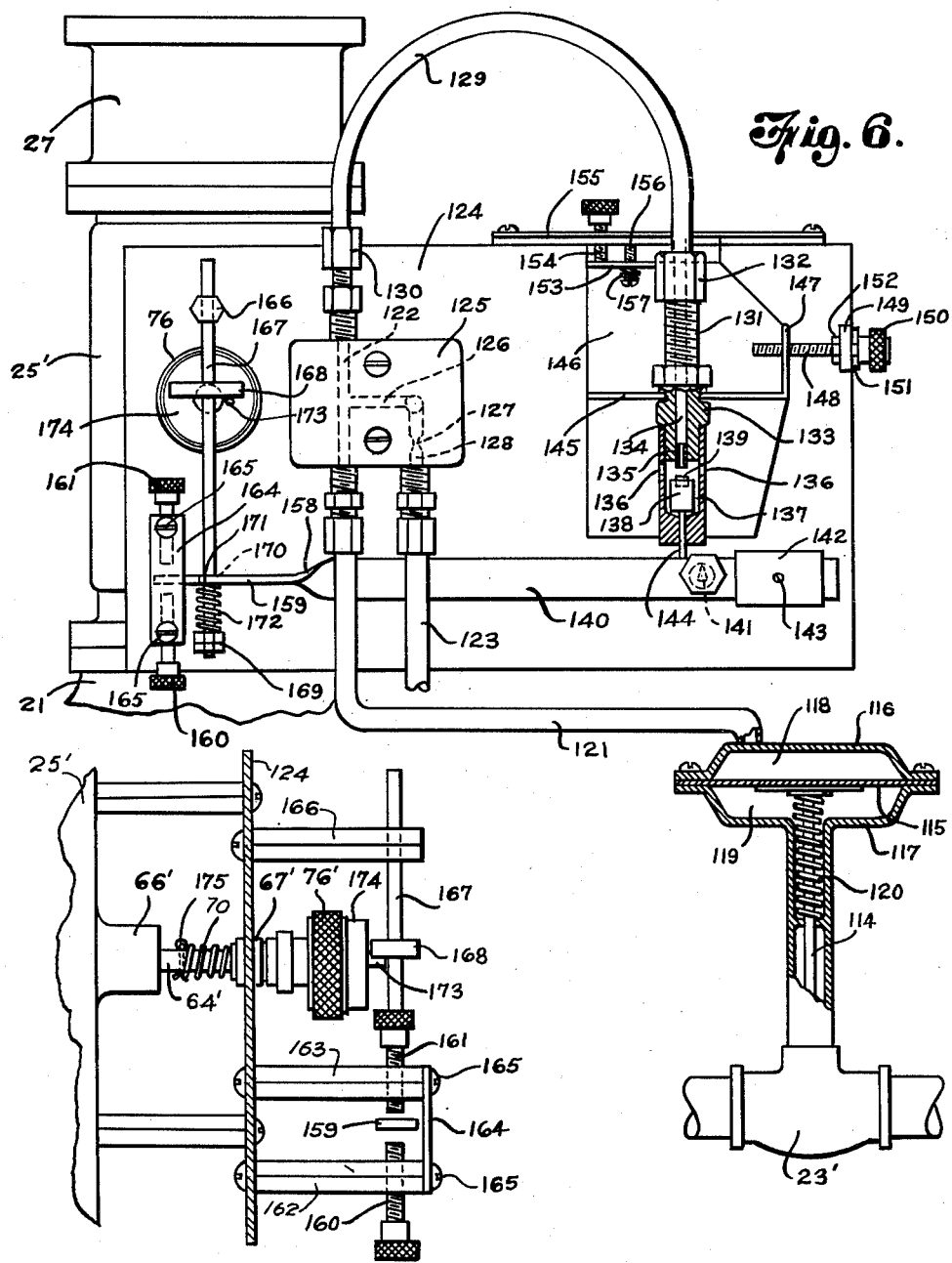
Fig. 6 is a view partly in elevation and partly in section of a modification, partly broken away.
Fig. 7 is a vertical elevational view taken perpendicularly to Fig. 6.

Instead of providing electrical means for controlling the position of the valve, the position of the valve controlling the flow of liquid may be determined by air operated means. Such means for positioning the valve member is shown in Figs. 6 and 7, in which an air controlled valve 23' is shown. The valve 23' has a stem 114, which is connected with the diaphragm 115 that is clamped between the members 116 and 117 at its edges, thus dividing the space between the members 116 and 117 into two chambers 118 and 119. Resilient means, such as the coil spring 120, tends to move the valve member provided in the member 23' in one direction, which in the form of the invention shown in Fig. 6 is in a seating direction, and movement of the diaphragm 115 by increase of pressure in the chamber 118 causes the valve to move in the opposite or in an opening direction.

The chamber 118 has a conduit 121 connected therewith, which is connected with a passage 122 in the block 125 mounted on the mounting plate 124. The block 125 has a passage 126 extending from the passage 122 which is connected with a passage 128 by means of a restriction or restricted orifice 127. The passage 128 is connected with a source of constant air pressure by means of the pipe 123.

Means for varying the pressure in the pipe 121 is provided comprising a pipe 129 connected with the passage 122 through a suitable screw-threaded coupling 130. The pipe 129 has a coupling 131 at the opposite end thereof, which is connected with a screw-threaded member 132 that connects it with a valve body 133.

Said valve body 133 has a passage 134 therein that has a tubular member 135 mounted in the end thereof and projecting slightly beyond the end of said passage to provide a reduced portion in said passage. Said valve body further has side openings 136 to the atmosphere and has a chamber 137 therein, into which said openings lead, that communicates with the tubular member 135. A valve member 138 is mounted in the chamber 137 and has a projecting portion 139 thereon that is adapted to engage the end of the passage in the member 135 or to assume suitable positions in spaced relation thereto, to vary the amount of air passing through the member 135 and thus through the tube 129, and out through the openings 136. The opening to atmosphere provided through the member 135 is of greater size than the restriction 127. It will be obvious that the less air that can discharge through the tube 129 the greater will be the effective pressure in the chamber 118 and the further will the diaphragm 115 move in opposition to the pressure of the spring 120.

A lever 140 is mounted on a knife edge fulcrum 141 provided on the plate 124 and an adjustable counterweight 142 is provided on said lever 140, the same being longitudinally slidable on the lever 140 and being adapted to be clamped in position by means of a set screw 143. The position of the lever 140 will determine the position of the valve 138, as said valve has a projecting pin or stem portion 144 that engages said lever. The sensitivity of the valve mechanism is determined by the spacing of the point of contact of the pin 144 with the lever relative to the fulcrum 141 and means is provided for adjusting the position of said pin 144 relative to the fulcrum. The tubular member 129 is flexible so that the curvature thereof can be varied to permit such adjustment. In order that such adjustment can be accomplished the valve body 133 is mounted on a flange 145 of a plate 146, which also has a flange 147 thereon that has a threaded opening therein, with which the screw-threaded member 148 engages, which is rotatable in an ear 149 provided on the plate 124, adjustment thereof being obtained by means of a knurled knob 150 fixed thereto, between which and said ear a nut 151 is provided, the member 148 being held against longitudinal movement relative to the ear 149 by means of the nut 151 and the nut 152, the nut 151 also serving to lock the parts in adjusted position. The plate 146 is also provided with a flange 153, with which the end of a screw-threaded member 154 engages, that in turn screw-threadedly engages in an opening in the bar 155 mounted on the plate 124 to provide for vertical adjustment of the valve body relative to the lever, said adjusting means also including a screw-threaded member 156 which engages with a screw-threaded opening in the bar 155, and which has a coil spring 157 mounted between the head thereof and the member 153.

The lever 140 is twisted at 158 to turn the portion 159 thereof into a plane at right angles to the body portion 140, the portion 159 of the lever 140 being mounted between a pair of stop screws 160 and 161, which are adjustably mounted in posts 162 and 163 extending from the plate 124 and which are connected together by means of a bar 164 by means of screw-threaded headed members 165. A post 166 also extends from the plate 124 and has a guide opening therein for the rod 167. Said rod 167 has a collar 168 thereon, which is fixed in position, and said rod has a screw-threaded lower end upon which the nut 169 is threaded. The lever 159 is provided with an opening 170 therein that is larger than said rod, and a washer 171 is mounted on said rod, a coiled compression spring 172 being provided between the washer 171 and the nut 169. The compression of the spring 172 can be adjusted by means of the nut 169 so that this will overcome the weight of the valve 138 and any movement of the rod 167 will be transmitted to the lever 140 to thus move the valve stem or pin 144 in response to the position of said lever 140.

By providing the yielding connection between the rod-like member 167 and the lever 140, any damage to the mechanism for moving the rod 167 will be avoided, should such movement of the rod 167 cause the end of the portion 159 of the lever to engage one of the stop members 160 or 161. The position of the rod 167 is determined by means of a pin 173, which engages the collar 168, and the spring 172 also serves to hold the collar 168 constantly in engagement with said pin. The pin 173 is mounted on a disk-like member 174, which is provided on the end of the shaft 64' that corresponds to the shaft 64 shown in Fig. 4, and is similarly adjusted or rotated by differential mechanism, which may be of the same character as that shown in Figs. 3 and 4, and which is actuated by the same means as previously described. Suitable frictional driving means may be provided between the disk-like member 174 and the shaft 64', similar to that previously described, comprising a spring 70' mounted between a cotter pin 175 on the shaft 64' and the friction clutch means 67', which may be manually adjusted by means of a knurled knob 76' in a similar manner to that described in connection with the form of the invention shown in Fig. 4, the knob 76' thus being adapted to manually adjust the disk-like member 174 to place the pin 173 in any desired starting position. The plate-like member 124 is mounted on the housing 25' corresponding to the housing 25 shown in Figs. 3 and 4 in any desired manner.

It will be obvious that rotation of the member 174 in a counter-clockwise direction as viewed in Fig. 6 will raise the member 168 and thus the rod-like member, and the lever 140 will rise so as to cause the valve member 138 to approach the member 135 reducing the size of the bleed opening and thus increasing the pressure in the chamber 118, causing the valve on the stem 114 to be opened further against the action of the spring 120, thus increasing the flow of the liquid passing through the valve 23'. Rotation of the member 174 in a clockwise direction will cause the opposite movement of the lever 140 and a movement of the valve 23' in a direction to close the same further. Thus the variations in the flow of the dry material will adjust the valve 23' to vary the flow of the liquid supplied so as to maintain the proper proportion between said dry material and liquid that is being supplied to the chamber 13, in a similar manner to that in which the electrical control means previously described does this. Also any variation in the flow of the liquid to cause any undesired increase or deficiency thereof relative to the amount of dry material fed will cause adjustment of the valve 23' by means of the differential mechanism and the air controlled means to provide the proper adjustment of the valve 23' to maintain the desired proportion between the dry material and the liquid fed to the chamber 13.

Instead of providing the differential mechanism shown in Figs. 3 and 4 to determine the position of the valve 138 by means of the position of the rod-like member 167, the means shown in Fig. 8 may be utilized, which is a very simple arrangement of such differential apparatus. Instead of providing the pin 173 to move the collar 168 fixed on said rod-like member 167, an arm 176 may be provided, which may have a forked end 177 between the bifurcations of which the rod 167 passes and which engages under the collar 168. Said arm or lever 176 extends from a sleeve 188 that is rotatably mounted on a shaft 178. The shaft 178 is connected with the flexible shaft 19 by suitable coupling means similar to that shown in Fig. 3. The shaft 179 extends from and is driven by the water meter, said shaft being mounted in a suitable bearing 180 in the housing 181, within which a differential gearing is provided, comprising a gear 182 that meshes with the gear 183 and a gear 184 that meshes with the gear 185. The gears 183 and 185 are fixed to each other to rotate together, the gear 182 being fixed to the shaft 179 and the gear 184 being fixed to the shaft 178.

The relative size of the gears 182, 183, 184 and 185 is such that when the desired proportion of liquid and dry material is being fed by the liquid and dry material feeding means that operate in proportion to the rotation of the shafts 179 and 19 there will be no rotation of the gears 183 and 185 around the gears 182 and 184. However, should there be any variation in the desired relative rate of feed, then the gears 183 and 185 will rotate around the gears 182 and 184 in one direction or the other, dependent upon whether the quantity of liquid fed is too great or too small relative to the quantity of dry material or solid material fed.

The gears 183 and 185 are mounted on a hub that has a pin 186 projecting therefrom, which is pivotally connected with a crank 187 provided on the sleeve 188. Thus rotation of the gears 183 and 185 around the gears 182 and 184 will cause angular movement of the crank 187 and a corresponding angular movement of the arm or lever 176, which will cause adjustment of the rod-like member 167 in a similar manner to that previously described, to adjust the air controlling means for the valve 23'. The bearing 189 is provided, in which the sleeve 188 is rotatable.

Instead of providing the dry material feeding means shown in Fig. 1, other dry material feeding means can be provided, such as that shown in Fig. 9, in which the hopper 190 is provided with an opening in the bottom thereof, which leads to a partly circular chamber 191, in which a rotary feeding member 192 for dry material is provided. The rotary feeding member is mounted on a shaft 193, which is driven from a variable speed drive 194, said variable speed drive being interposed between the motor 195 and said rotary feeding member 192. Thus the rate of feed will be proportional to the speed of the output shaft of the variable speed drive 194. Suitable agitating means 196 driven through a drive connection including the crank disk 197 and the link 198 keeps the contents of the hopper agitated so as to prevent bridging over thereof and assuring a continuous feed to the rotary member 192, the agitating means not being a part of this invention.

The output shaft of the variable speed drive is connected with a flexible shaft 199, which corresponds to the flexible shaft 19 shown in Fig. 1 of the drawings, through an adjustable driving connection 222 for adjusting the predetermined ratio of dry material fed by the member 192 to the liquid supplied through liquid supply pipe 14. The valve 23 is provided between the pipe 22 and the pipe 24, which leads to the water meter 21, and from which the liquid supply pipe 14 leads into the chamber 13 as in the form of the invention disclosed in Fig. 1. The suspension or solution that results from the mixing of the dry material and liquid in the chamber 13 passes out through the outlet pipe 113, as in the form of the invention shown in Fig. 1, and the same differential drive and electrical control means is provided as in the form of the invention shown in Fig. 1, the same numerals being applied to the corresponding parts of the valve controlling mechanism illustrated in Fig. 9 as in Fig. 1.

As the material fed to the chamber 13 through the discharge passage 200 from the rotary feeder 192 is in proportion to the rate of rotation of the flexible shaft 199, the proportioning control of the supply of liquid to that of the dry material will be obtained in the same manner as previously described, the valve 23 being adjusted through the differential mechanism, such as illustrated in Figs. 3 and 4, or that shown in Fig. 8, to maintain the valve 23 in proper adjustment to supply the proper proportion of liquid to solid material to maintain the same relative proportion between said solid material and liquid fed to the chamber 13 at all times.

Instead of feeding a dry material and liquid in a predetermined proportion to each other and controlling the proportions of these materials to each other by such a differential controlling means as above described, the proportion of two liquids to each other can be similarly controlled, the flow of the liquid through the water meter and the liquid feed by a suitable liquid feed device being maintained in a definite proportion to each other by the proportional controlling means forming part of this invention.

Figure 10:
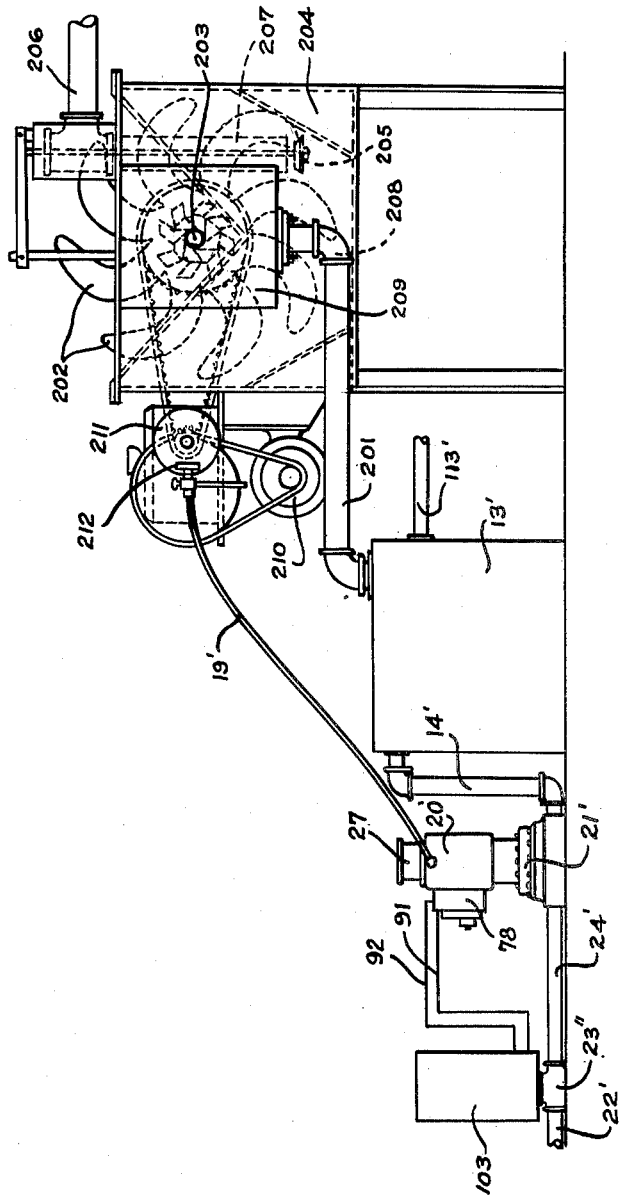
Fig. 10 is a view similar to Fig. 1 showing my means for controlling the position of a valve controlling the flow of a liquid relative to the flow of another liquid.

Such an apparatus is illustrated in Fig. 10, in which the chamber 13' has a liquid supply pipe 14' leading into the same and a liquid supply conduit 201 also leading into the same. Liquid is supplied at a desired rate to the chamber 13' through the conduit 201 by means of a rotary liquid feeding member having the buckets 202, which are mounted to rotate with the shaft 203 and which dip into a body of liquid in a tank 204, the level of which is controlled by a suitable float valve 205, the liquid being supplied to said tank 204 through a pipe 206, which leads to a pipe 207, the outlet of which is controlled by said float valve. The buckets 202 empty into discharge members or lips 208, which are located externally of the tank 204 in a chamber 209 so that when the buckets 202 pass to the upper side of the spider-like member formed thereby, during their rotation, the liquid will flow toward the shaft 203 into the discharge members 208, which discharge their contents into the chamber 209 from which the contents of the discharge members 208 pass into the conduit 201 and into the chamber 13'.

The rotatable liquid feeding member made up of the buckets 202 and discharge members 208 is rotated by means of the motor 210 through a variable speed drive 211, the speed of which may be controlled manually or in any other suitable manner, the output shaft of the variable speed drive 211 driving the shaft 203 of the rotatable liquid feeding member, and the flexible shaft 19' being connected with said output shaft of the variable speed drive device 211, through an adjustable driving connection 212, whereby the ratio of feed of liquids through pipes 14' and 201 may be adjusted. The shaft 19' is connected with the differential controlling device in the same manner as the shaft 19, the controlling device 20' being mounted on the water meter 21' in the same manner as the controlling device 20 previously described and operating in the same manner. As the electrical controlling means for the valve 23" interposed between the liquid supply pipe 22' and the pipe 24' leading to the meter 21' is the same as that previously described in connection with Fig. 1, the same reference numerals are applied to the parts thereof shown in Fig. 10 as were applied to the corresponding parts in Fig. 1. The discharge of the resulting product from the mixture of the two liquids in the chamber 13' passes out through the discharge pipe 113'.

The operation of the device shown in Fig. 10 is analogous to that of the device shown in Fig. 1, in that any change in the rate of feed of the liquid coming from the pipe 206 through the conduit 201 to the chamber 13' due to change in the speed of the variable speed device 211 will correspondingly change the speed of the flexible shaft 19' and adjust the differential control device to adjust the valve 23'' so that the same proportion of liquid passing through the pipe 14' into the chamber 13' will be maintained relative to that passing through the conduit 201 as was the case prior to the change in speed of the variable speed device. Similarly any change in the rate of flow through the water meter 21' will adjust the variable speed device so as to adjust the valve 23'' to maintain the proper proportion between the liquid supply through the pipe 14' and the conduit 201.

In all forms of the invention the adjustment of the proportions can be varied by adjusting the adjustable speed changing driving connection between the flexible shaft and the output shaft of the variable speed drive or by the manual controlling means 76 or 76', as the case may be, or in the case of the simplified differential means shown in Fig. 8, by changing the relative size of the gears 182, 183, 184 and 185.

What I claim is:

1. The combination with a receptacle, of means for feeding a material to said receptacle at a variable rate comprising a feeding member and driving means for said feeding member, means for supplying a liquid to said receptacle comprising a conduit leading to said receptacle, a valve controlling the flow of liquid through said conduit, and means controlling the position of said valve to maintain a predetermined proportion between said material at all rates of feed thereof and said liquid comprising a member rotating with said driving means proportional to the rate of feed of said feeding means, a member rotated by the liquid passing through said conduit to rotate at a rate proportional to the rate of flow of liquid therethrough, differential means connecting said last mentioned members and a valve positioning member actuated by said differential means.

2. The combination with a receptacle, of means for feeding dry material to said receptacle at a variable rate, means for supplying a liquid to said receptacle comprising a conduit leading to said receptacle, a valve controlling the flow of liquid through said conduit, and means controlling the position of said valve to maintain a predetermined proportion between said dry material and said liquid at all rates of feed of said dry material comprising a member rotating with said dry material feeding means proportional to the rate of feed thereof, a member rotated by the liquid passing through said conduit to rotate at a rate proportional to the rate of flow of liquid therethrough, differential means connecting said last mentioned members and a valve positioning member actuated by said differential means.

3. The combination with a receptacle, of means for feeding a material to said receptacle, comprising a feeding member and driving means for said feeding member means for varying the rate of feed of said material comprising means for varying the speed of said driving means, means for supplying a liquid to said receptacle comprising a conduit leading to said receptacle, a valve controlling the flow of liquid through said conduit, and means controlling the position of said valve to maintain a predetermined proportion between said material at all rates of feed thereof and said liquid comprising a member rotating with said driving means proportional to the rate of feed of said feeding means, a member rotated by the liquid passing through said conduit to rotate at a rate proportional to the rate of flow of liquid therethrough, differential means connecting said last mentioned members and a valve positioning member actuated by said differential means.

4. The combination with a receptacle, of means for feeding a material to said receptacle comprising a dry material conveyor discharging into said receptacle, variable speed driving means for varying the speed of said conveyor, means for supplying a liquid to said receptacle comprising a conduit leading to said receptacle, a valve controlling the flow of liquid through said conduit, and means controlling the position of said valve to maintain a predetermined proportion between said material and said liquid comprising a member rotating with said driving means proportional to the speed thereof, a member rotated by the liquid passing through said conduit to rotate at a rate proportional to the rate of flow of liquid therethrough, differential means connecting said last mentioned members and a valve positioning member actuated by said differential means.

5. The combination with a receptacle, of means for feeding a material to said receptacle at a variable rate, means for supplying a liquid to said receptacle comprising a conduit leading to said receptacle, an electrically controlled valve controlling the flow of liquid through said conduit, and means for adjusting the electrical control for said valve to adjust the position of said valve to maintain a predetermined proportion between said material and said liquid comprising a member rotating with said feeding means proportional to the rate of feed thereof, a member rotated by the liquid passing through said conduit to rotate at a rate proportional to the rate of flow of liquid therethrough, differential means connecting said last mentioned members, and a rheostat the adjustment of which determines the adjustment of said electrical control actuated by said differential means.

6. A device for maintaining a predetermined proportion between the rate of supply of a liquid and another material comprising a liquid line, a valve controlling flow through said line, a meter measuring flow through said line, a device operated by said meter for controlling the position of said valve comprising a differential mechanism having a part driven in proportion to the rate of supply of said material, a part driven by said meter, and a member movable by said differential mechanism only upon said rates of supply becoming out of said predetermined proportion, said member being movable in opposite directions, said valve being electrically adjusted, and a valve adjusting rheostat actuated by said member in a direction to adjust the position of said valve to restore said predetermined proportion of said rates of supply.

7. A device for maintaining a predetermined proportion between the rate of supply of a liquid and another material comprising a liquid line, a valve controlling flow through said line, a meter measuring flow through said line, a device operated by said meter for controlling the position of said valve comprising a differential mechanism having a part driven in proportion to the rate of supply of said material, a part driven by said meter, and a member movable by said differential mechanism only upon said rates of supply becoming out of said predetermined proportion, said member being movable in opposite directions, valve controlling means actuated by said member to adjust said valve in a direction to restore said predetermined proportion of said rates of supply, a frictional driving connection between said valve controlling means and said member and manually actuated adjusting means for said valve controlling means between said friction driving connection and said valve controlling means.

8. A device for maintaining a predetermined proportion between the rate of supply of a liquid and another material comprising a liquid line, a valve controlling flow through said line, a meter measuring flow through said line, a device operated by said meter for controlling the position of said valve comprising a differential mechanism having a part driven in proportion to the rate of supply of said material, a part driven by said meter, and a member movable by said differential mechanism only upon said rates of supply becoming out of said predetermined proportion, said member being movable in opposite directions, said valve being electrically adjusted, a valve adjusting rheostat actuated by said member in a direction to adjust the position of said valve, a frictional driving connection between said rheostat and said member and manually actuated adjusting means for said rheostat between said rheostat and said frictional driving connection.

9. The combination with a receptacle, of means for feeding a material to said receptacle, means for varying the rate of feed of said material, means for supplying a liquid to said receptacle comprising a conduit leading to said receptacle, a valve controlling the flow of liquid through said conduit, and means controlling the position of said valve to maintain a predetermined proportion between said material and said liquid as said rate of feed is varied comprising a member rotating with said feeding means proportional to the rate of feed thereof, a member rotated by the liquid passing through said conduit to rotate at a rate proportional to the rate of flow of liquid therethrough, differential means connecting said last mentioned members and a valve positioning member actuated by said differential means, including a friction clutch device, and means between said friction clutch device and said valve positioning member for manually actuating said means independently of said differential mechanism to adjust said valve positioning member relative to said differential means.

10. The combination with a receptacle, of means for feeding a material to said receptacle, means for varying the rate of feed of said material, means for supplying a liquid to said receptacle comprising a conduit leading to said receptacle, a valve controlling the flow of liquid through said conduit, means controlling the position of said valve to maintain a predetermined proportion between said material and said liquid comprising a member rotating with said feeding means proportional to the rate of feed thereof, a member rotated independently of the member rotating with said feeding means by the liquid passing through said conduit to rotate at a rate proportional to the rate of flow of liquid therethrough, differential means connecting said last mentioned members and a valve positioning member actuated by said differential means upon any variation from said predetermined proportion, and means for adjusting said predetermined proportion, comprising means for adjusting said valve positioning member and valve relative to said differential means.

11. The combination with a receptacle, of means for feeding a material to said receptacle at a variable rate, means for supplying a liquid to said receptacle comprising a conduit leading to said receptacle, a valve controlling the flow of liquid through said conduit, means controlling the position of said valve to maintain a predetermined proportion between said material and said liquid comprising a member rotating with said feeding means proportional to the rate of feed thereof, a member rotated independently of the member rotating with said feeding means by the liquid passing through said conduit to rotate at a rate proportional to the rate of flow of liquid therethrough, differential means connecting said last mentioned members and a valve positioning member actuated by said differential means upon any variation from said predetermined proportion, and means for adjusting said valve positioning member relative to said differential means to change said predetermined proportion.

LYNDUS E. HARPER.

REFERENCES CITED

The following references are of record in the file of this patent:

UNITED STATES PATENTS

| Number | Name | Date |
|---|---|---|
| 881,135 | Kirk | Mar. 10, 1908 |
| 1,121,846 | Kirk | Dec. 22, 1914 |
| 1,200,324 | Earl et al. | Oct. 3, 1916 |
| 1,270,332 | Schaffer | June 25, 1918 |
| 1,753,662 | Merker | Apr. 8, 1930 |
| 1,763,335 | Watts | June 10, 1930 |
| 1,926,333 | Fulcher | Sept. 12, 1933 |
| 1,929,693 | Jones et al. | Oct. 10, 1933 |
| 1,944,803 | Ornstein | Jan. 23, 1934 |
| 1,961,350 | Grunsky | June 5, 1934 |
| 1,967,690 | Sherman | July 24, 1934 |
| 2,005,950 | Moroney et al. | June 25, 1935 |
| 2,038,667 | Neff | Apr. 28, 1936 |
| 2,072,442 | Collins | Mar. 2, 1937 |
| 2,102,584 | Brown | Dec. 21, 1937 |
| 2,174,729 | Schlack | Oct. 3, 1939 |
| 2,211,753 | Leopold | Aug. 20, 1940 |
| 2,262,031 | Meyer | Nov. 11, 1941 |